THERMOSTAT ACTUATORS OF RESINOUS MATERIAL

Filed Sept. 25, 1963

INVENTORS
CORNELIUS B. MURPHY
REGINALD J. BOOT
BY Chapin & Neal
Attorneys 3,291,935
Patented Dec. 13, 1966

1

3,291,935

THERMOSTAT ACTUATORS OF RESINOUS MATERIAL

Cornelius B. Murphy, 51 Cedar Lane, Scotia, N.Y., and Reginald J. Boot, 1356 Clifton Park Road, Niskayuna, N.Y.

Filed Sept. 25, 1963, Ser. No. 311,504
7 Claims. (Cl. 200—113)

The present invention relates to improvements in thermally responsive sensor elements particularly in the form of actuators for thermostat controls.

One object of the invention is to significantly reduce the cost of actuators employed in thermostat controls.

Another object of the invention is to improve the sensitivity of such actuators.

A further object of the invention is to provide an actuator of the type referred to which can be employed directly in corrosive mediums.

In broad terms, these objects are obtained by employing an actuator formed of two polymeric components which are joined at two spaced points. The two components have different linear coefficients of thermal expansion whereby there is a flexure of the element in response to temperature variations due to the different rates of expansion of the two components.

Thermostat actuators are usually conductive and function as a switch. In order to obtain such functioning while retaining the benefits of an essentially polymeric construction, one of the components may have sufficient filler such as aluminum or graphite to make it electrically conductive. In the more common configuration of a thermostat actuator, a lead wire would be connected to one end thereof which is fixed and current could flow through the conductive component to a contact at the opposite or free end of the actuator. The contact engages an appropriate fixed contact in response to temperature changes and thus closes an appropriate control circuit. Alternatively, current could be conducted from the lead wire to the contact at the free end of the actuator by a conductive bonding agent which is employed to join the two components as an integrally laminated structure, or metallic conductive paths can be provided which have essentially no effect on the flexure of the polymeric components in response to temperature changes.

The use of polymeric materials as herein described has several advantages beyond their generally intrinsic economy of manufacture and assembly. Such materials employed in the manner taught herein provide a greater sensitvity as evidenced by greatly increased rates of deflection per degree of temperature variation. Additionally, such constructions can be fabricated in a practical and economical fashion for use in direct exposure to corrosive mediums.

The above and other related objects and features of the invention will be apparent from a reading of the following description of the disclosure found in the accompanying drawing and the novelty thereof pointed out in the appended claims.

2

Common to all of the actuators shown in the figures is the provision of two polymeric components 10 and 12 which are joined together at least two spaced points. The components 10 and 12 are further characterized by having different linear coefficients of thermal expansion (l.c.t.e.). The type of actuator illustrated is, in use, essentially a cantilever which is held in a fixed position at one end (the left hand end), with its free end (right hand end) deflecting to actuate a control device in response to temperature changes.

For convenience of reference, each of the upper components 10 in the figures has a greater l.c.t.e than the lower components 12. This differential in l.c.t.e. may be obtained by a proper selection of polymeric materials by anyone skilled in the art based on the known physical properties of the materials selected. This is to say that the polymeric materials employed embrace substantially all known or conceivable solid polymers, including thermosets, thermoplastics, hybrids of the two, and natural as well as synthetic polymers. Having reference again to the use of the term polymeric, it is herein intended to include both filled and unfilled polymers, notwithstanding the fact that the filler material may be inorganic.

Having noted that the upper components 10 have the greater l.c.t.e., it is generally preferable that they be formed of unfilled polymeric material in order to obtain maximum advantage of the inherently high l.c.t.e. of polymers.

The lower components 12 may also be formed of an unfilled polymeric material, but it is generally preferable that they be filled or heavily loaded with an inorganic filler in order to obtain a maximum differential in l.c.t.e. between the two components. For most purposes, the polymeric material of the lower components 12 would be filled with an inexpensive, inert material such as chalk, silica or other similar materials of relatively small particle size. However, where a maximum differential in l.c.t.e. is desired, the polymeric material of the elements 12 would be filled with a powdered material having a negative coefficient of expansion, for example $\beta$-spodumene or $\beta$-eucryptite. Where it is desired that the actuator serve as a conductor, the lower element 12 would be filled with powdered graphite or aluminum which would be sufficient to make it conductive and would also lower its l.c.t.e to a desired extent.

Figure 1:
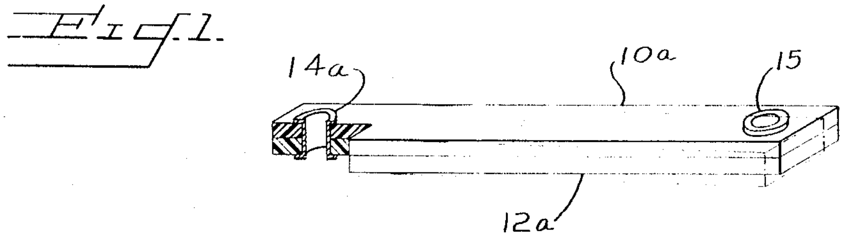
FIG. 1 is a perspective view of a thermostat actuator embodying the present invention.
Figure 2:
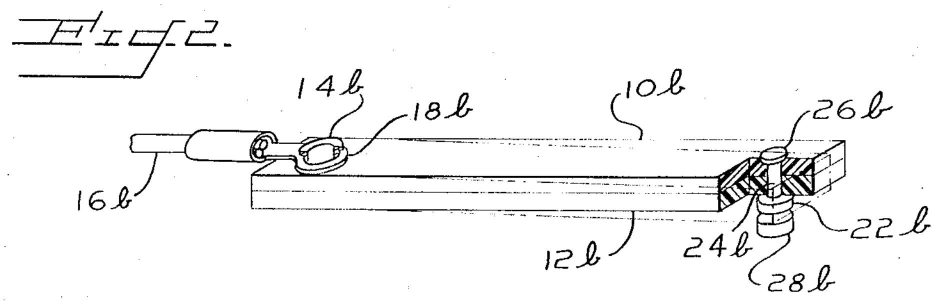
FIG. 2 is a perspective view of another embodiment of the invention.
Figure 3:
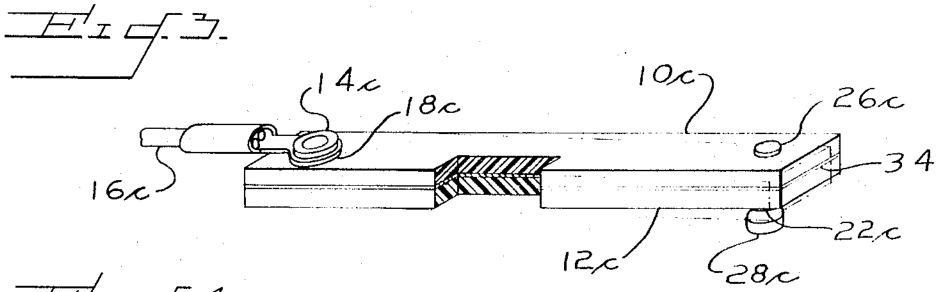
FIG. 3 is a perspective view of a further embodiment of the invention.
Figure 4:
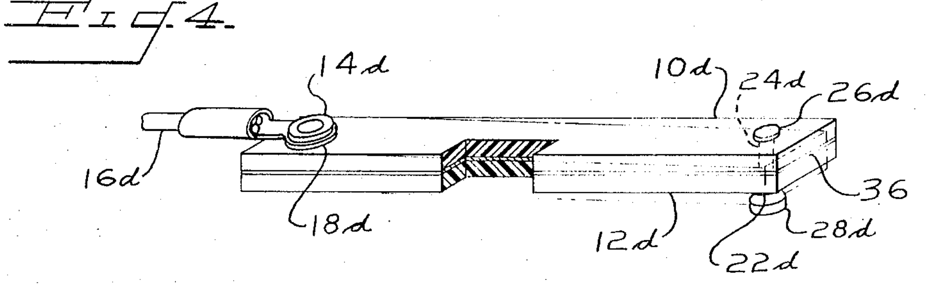
FIG. 4 is a perspective view of yet another embodiment of the invention.
Figure 5:
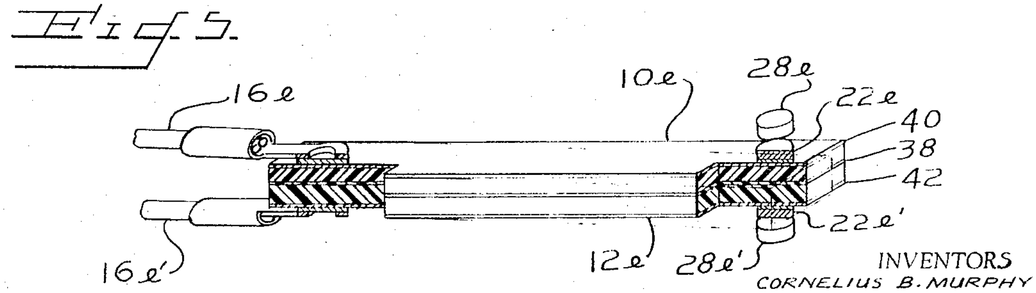
FIG. 5 is a perspective view of yet a further embodiment of the invention.

As noted above, the actuators have the further common feature of being joined together at two spaced points preferably adjacent their opposite ends. FIGS. 1, 2 and 4 illustrate the use of fastener elements for this purpose, while FIGS. 3 and 5 show the two components bonded together as an integral laminate. Either fabrication results in a composite structure which will flex as a cantilever in response to temperature changes as one component elongates to a greater extent than the other.

Referring specifically to the actuator shown in FIG. 1, the component 10*a* is formed of unfilled 6/6 nylon (the condensation of adipic acid and 1–6 diamine n-hexane). The component 12*a* is formed of this same polymer but filled with 30% chopped glass fibers. The two components are secured together at spaced points adjacent their opposite ends by eyelets 14*a* and 15. With an increase in temperature, the component 10*a* elongates to a greater extent than the component 12*a* so that the free end of the actuator is flexed to the illustrated phantom position as the right hand end is held fixed by appropriate means. Flexure of the free end of the actuator can be employed, through mechanical means, to control the circuit in which the thermostat actuator is incorporated.

To illustrate the extent of deflection obtained by the components 10*a* and 12*a*, the particular polymeric materials being simply illustrative, displacement of the free end of the actuator may be calculated as follows:

$$\frac{d}{T}=\frac{Kl^2}{t}$$

where:

$d/T$=Temperature deflation rate (in./° C.) for a cantilever
$K$=The difference in linear coefficient of thermal expansion of the two components 10 and 12 (in./in./° C.)
$l$=Active length
$t$=Total thickness For components 10*a* and 12*a* in FIG. 1, having an active length of 4 inches and a thickness of .010 inch—total thickness .020 inch—deflection is calculated as:

| | |
|---|---|
| l.c.t.e. of 6/6 nylon | $10\times10^{-5}$ |
| l.c.t.e. of 6/6 nylon 30% glass filled | $1.2\times10^{-5}$ |
| K | $8.8\times10^{-5}$ |

$$\frac{d}{T}=\frac{8.8\times10^{-5}\times4^2}{.020}$$

$$\frac{d}{T}=.0704 \text{ in./°C.}$$

The same calculations applied to a bimetallic actuator having the same dimensions and available from a commercial source as having superior deflection characteristics results in a deflection rate of .015 in./° C.

Actual measurements bear out the accuracy of these calculations.

As noted above, thermostat actuators generally function as a switch element and the actuators of FIGS. 2–5 incorporate this feature.

With specific reference now to FIG. 2, the component 10*b* is formed of unfilled polypropylene and the component 12*b* is formed of this same polymer loaded with sufficient aluminum powder to make it a functional electrical conductor. The use of the aluminum filler in component 12*a* also creates the necessary differential in l.c.t.e. as discussed above.

A lead wire 16*b* and end fitting 18*b* are secured to the left hand or fixed end of the actuator by an eyelet 14*b* which also serves the further function of securing or joining the components together adjacent the fixed end of the actuator. A contact 22*b* is mounted on the free end of the actuator by an integral pin 24 extending through the components 10*b* and 12*b* and upset to form a head 26*b*, thus securing the contact 22*b* to the actuator. This also serves the dual function of securing together the components 10*b* and 12*b* at a point spaced from the eyelet 14*b*.

Actually the lead wire 16*b* can be secured to either component of the actuator since the eyelet 14*b* is preferably made of metal and current can either flow directly from the connector 18*b* to component 12*b* or through eyelet 14*b* to this component. In use, a predetermined temperature variation will cause a deflection of the free end of the actuator sufficient for the contact 22*b* to engage a fixed contact 28*b* and thus complete whatever control circuit the actuator is incorporated in.

The actuator of FIG. 3 is particularly adapted for use in high temperature control systems. Thus the component 10*c* is formed of unfilled, cured phenolic resin and the component 12*c* is formed of this same polymer loaded with powdered β-eucryptite, a mineral mentioned above having a negative l.c.t.e. The selection of the thermoset polymer and the mineral filler enable the use of this actuator at relatively high working temperatures. The actuator further has a high degree of sensitivity due to the use of β-eucryptite which enables a maximum differential in l.c.t.e. between the components 10*c* and 12*c* and thus a maximum deflection as will be apparent from the previous calculations.

Again the actuator of FIG. 3 is intended to function as a switching element. Thus a lead wire 16*c* and connector 18*c* are secured to the fixed end of these actuators by a metal eyelet 14*c*. Likewise, a contact 22*c* is attached to the free end of the actuator in the same fashion as in FIG. 2 with the securing pin upset to form a head 26*c*. In this actuator the two components are further bonded together by the use of a thin layer 34 of cured epoxy resin which is filled with aluminum powder sufficient to make it an effective electrical conductor, the epoxy resin also being resistant to relatively high temperatures. The showing of the epoxy layer in FIG. 3 is greatly exaggerated for purposes of illustration, whereas in fact this layer is extremely thin and functions essentially as a conductor and a bonding or gluing agent and not as a functional element of the actuator so as to affect the extent of its deflection.

With this in mind, it will be apparent that upon deflection of the actuator in FIG. 3 in response to a temperature increase, contact 22*c* will engage a fixed contact 28*c* and thus complete a circuit from that contact through the glue layer 34 through the eyelet 14*c* and thus to the lead wire 16*c*.

FIG. 4 illustrates an actuator particularly adapted for use in corrosive mediums. The component 10*d* is formed of polytrifluorochloroethylene, while the component 12*d* is formed of this same polymer having chopped glass fibers included as a filler in order to obtain the desired differential in coefficients in expansion. The inner surface of the component 10*d* is covered by a conductive metallized layer 36. Lead wire 16*d* and connector 18*d* are secured to the fixed end of this actuator by eyelet 14*d* which serves the further function of joining together the two components 10*d* and 12*d*. Contact 22*d* is secured to the free end of this actuator as in the previous two actuators by a pin 24*d* which is upset to form a head 26*d*, thus joining the components 10*d* and 12*d* at their free ends. The pin 24*d* and eyelet 14*d* provide a current path from the lead wire 16*d* to contact 22*d*, through the metallized layer 36 which enables completion of a circuit upon engagement of a contact 22*d* with a fixed contact 26*d* as a result of a temperature increase and resultant deflection of the actuator to cause such engagement of the contacts.

The polytrifluorochloroethylene components 10*d* and 12*d* are resistant, if not immune, to most all types of corrosive attack. The contacts 22*d*, pin 24*d*, eyelet 14*d* and connector 18*d* are made of a noble metal such as gold and thus are likewise resistant, if not immune, to most forms of corrosive attack. The actuator of FIG. 4 is thus suitable for use directly immersed in a corrosive medium. It would, of course, be apparent that if the lead wire 16*d* were not properly insulated, it would be made of noble metal, as also would be the fixed contact 26*d*.

Reverted back to the metallized layer 36, disclosed in this and the succeeding embodiments, the techniques for applying such layers are well known to those skilled in the art. Such metallized layers are quite economical in that their thickness may be so small as to require measurement in Angstrom units. Here again the conductive layer, while exaggerated in the drawing, does not materially affect the flexure of the composite actuator structure which is dependent upon the differential in l.c.t.e. between the components 10*d* and 12*d*. The layer 34 may be in the order of 1,000 Angstorms and because of its extreme thinness and the protection which it receives from the components 10*d* and 12*d*, it does not necessarily need to be formed of a noble metal since with only this minute edge exposed any attack from the corrosive medium would be negligible.

Alternatively, the metallized layer 34 could be replaced by a layer of extremely thin conductive foil which again would serve as a conductor and not as a functional element having any effect on the flexure of the actuator in response to the temperature changes.

FIG. 5 shows an actuator which economically provides a duel switching element. Thus, the components 10*e* and 12*e* may be of 6/6 nylon and 6/6 nylon filled with 30% glass fibers, as in FIG. 2. The two components are secured together by a cured epoxy layer to form a composite laminate. Again the thickness of the epoxy layer 38 is greatly exaggerated in the drawings and serves simply as bonding agent and not as a functional element affecting deflection of the actuator. The outer, i.e. upper and lower, surfaces of the components 10*e* and 12*e* are coated with conductive layers 40 and 42 which again may be formed by a metallizing process. The layers 40 and 42 are insulated from each other by the material of the components 10*e* and 12*e*.

A lead wire 16*e* is secured at the fixed end of the actuator to the metallized layer 40 by a conductive bonding agent. Here again a cured metalized epoxy resin may be used. A contact 22*e* is secured at the free end of this actuator to the metallized layer 40 by the use of the same conductive bonding agent and adapted to engage a fixed contact 28*e* as a result of a temperature increase and flexure of the actuator to the illustrated phantom position.

A second lead wire 16*e'* is attached to the fixed end of the actuator by means of a conductive bonding agent securing it to the metallized layer 42. A second contact 22*e'* is mounted on the free end of the actuator by a conductive bonding agent bonding it to the metallized layer 42. The contact 22*e'* is adapted to engage a fixed contact 28*e'* in response to a reduction of temperature sufficient to cause deflection of the actuator in an upward direction to the illustrated phantom position.

The actuator of FIG. 5 economically enables the incorporation of dual control circuits operative between predetermined upper and lower limits, as one circuit would be completed from the lead wire 16*e* to the contact 28*e* and the other circuit would be completed from the lead wire 16*e'* to the fixed contact 28*e'*.

Having thus described the invention, what is claimed as novel and desired to be secured by Letters Patent of the United States is:

1. A thermostat actuator comprising two resinous components joined at spaced points adjacent the longitudinal ends thereof, one of said components comprising an essentially pure, unfilled, polymer resinous material, and the other component having a low linear coefficient of thermal expansion relative to said one component and formed of a resinous material filled with material having a relatively low linear coefficient of thermal expansion.

2. A thermostat actuator comprising two elongated resinous components joined at spaced points, a lead wire connected to one end of the actuator and a contact mounted on the opposite end thereof, and conductive means providing a path for the flow of current from the lead wire to the contact, one of said components comprising an essentially pure, unfilled, resinous material, and the other component having a low linear coefficient of thermal expansion relative to said one component and formed of a resinous material filled with material having a relatively low linear coefficient of thermal expansion whereby said contact will engage a fixed contact and complete a control circuit in response to a variation in temperature.

3. A thermostat actuator comprising two elongated resinous components joined together by a thin layer of electrically conductive material, a lead wire connected to one end of the actuator and a contact mounted on the opposite end thereof, and conductive means including at least in part said conductive layer providing a path for the flow of current from the lead wire to the contact, one of said components comprising an essentially pure, unfilled, resinous material, and the other component having a low linear coefficient of thermal expansion relative to said one component and formed of a resinous material filled with material having a relatively low linear coefficient of thermal expansion whereby said contact will engage a fixed contact and complete a control circuit in response to a variation in temperature.

4. A thermostat actuator comprising two elongated resinous components joined at spaced points adjacent the longitudinal ends thereof, a lead wire connected to one end of the actuator and a contact mounted on the opposite end thereof, one of said components being filled with a conductive material sufficient for the component itself to be conductive and imparting to said one component a lower linear coefficient of thermal expansion than the other component, the other of said components being formed of an essentially pure, unfilled, resinous material, said one component providing, at least in part, conductive means for flow of current from the lead wire to the contact whereby said contact will engage a fixed contact and complete a control circuit in response to a variation in temperature.

5. A thermostat actuator comprising two elongated resinous components joined at spaced points adjacent the longitudinal ends thereof, a lead wire connected to one end of the actuator and a contact mounted on the opposite end thereof, one surface of one of said components having a thin metallized layer, said layer providing, at least in part, a path for the flow of current from the lead wire to the contact, one of said components comprising an essentially pure, unfilled, resinous material, and the other component having a low linear coefficient of thermal expansion relative to said one component and formed of a resinous material filled with material having a relatively low linear coefficient of thermal expansion whereby said contact will engage a fixed contact and complete a control circuit in response to a variation in temperature.

6. A thermostat actuator comprising two elongated resinous components joined together at spaced points adjacent the longitudinal ends thereof, the opposed outer surfaces of said components having thin metallized layers, said layers being electrically insulated one from the other, a pair of lead wires at one end of said actuator respectively connected to the metallized layers, a pair of contacts at the opposite end of said actuator respectively connected to said metallized layers, one of said components having a higher linear coefficient of thermal expansion than the other component whereby one of said contacts will engage fixed contact and complete a control circuit in response to a variation in temperature, and the other contact will engage a second fixed contact and complete a second control circuit in response to a reverse variation in temperature.

7. A thermostat actuator as in claim 6 wherein the two resinous components are joined together by a sealing agent and conductive bonding material is used to connect the lead wires and contacts to said metallized layers.

References Cited by the Examiner

UNITED STATES PATENTS

| | | | |
|---|---|---|---|
| 2,744,981 | 5/1956 | Spears | 200—113 |
| 2,800,555 | 7/1957 | Sundt | 200—122 |
| 2,863,025 | 12/1958 | Flanagan | 200—138 |
| 2,966,062 | 12/1960 | Eskin et al. | 73—378 |
| 3,002,386 | 10/1961 | Flanagan | 200—113 X |

FOREIGN PATENTS

| | | |
|---|---|---|
| 663,355 | 8/1938 | Germany. |

OTHER REFERENCES

Carley J. F.: Modern Plastics Encylopedia, 1962, Sept. 1961, vol. 39, No. 1A TP 986, A2 M5 C.4 (pages 23–26 and 40–44).

BERNARD A. GILHEANY, *Primary Examiner.*

L. A. WRIGHT, T. D. MACBLAIN, *Assistant Examiners.*